United States Patent
Laish et al.

(10) Patent No.: US 8,135,431 B2
(45) Date of Patent: Mar. 13, 2012

(54) MULTI-DIMENSIONAL ADAPTIVE TRANSMISSION TECHNIQUE

(75) Inventors: Isacc Ben Laish, Kfar Saba (IL); Magal Pinchas, Tel-Aviv (IL); Ronen Tamam, Moshav Elishema (IL)

(73) Assignee: Gilat Satellite Networks, Ltd. (IL)

( * ) Notice: Subject to any disclaimer, the term of this patent is extended or adjusted under 35 U.S.C. 154(b) by 563 days.

(21) Appl. No.: 12/337,330

(22) Filed: Dec. 17, 2008

(65) Prior Publication Data
US 2009/0175185 A1 Jul. 9, 2009

Related U.S. Application Data

(60) Provisional application No. 61/014,478, filed on Dec. 18, 2007.

(51) Int. Cl.
*H04B 7/00* (2006.01)
(52) U.S. Cl. .......................... 455/522; 455/3.01; 455/39
(58) Field of Classification Search .................. 455/522, 455/39, 427, 3.01, 3.02
See application file for complete search history.

(56) References Cited

U.S. PATENT DOCUMENTS

| | | | | |
|---|---|---|---|---|
| 5,943,610 A * | 8/1999 | Endo | ............................... | 455/69 |
| 5,977,913 A * | 11/1999 | Christ | ........................... | 342/465 |
| 6,674,788 B2 * | 1/2004 | Lomp et al. | .................... | 375/130 |
| 7,099,683 B2 * | 8/2006 | Palmeri et al. | ................ | 455/522 |
| 7,502,406 B2 * | 3/2009 | Lomp et al. | .................... | 375/140 |
| 2003/0050015 A1 | 3/2003 | Kelly | | |
| 2004/0033780 A1 | 2/2004 | Kelly | | |
| 2004/0219909 A1* | 11/2004 | Kennedy et al. | ........... | 455/422.1 |
| 2009/0042594 A1* | 2/2009 | Yavuz et al. | .................. | 455/522 |
| 2009/0286497 A1* | 11/2009 | Akkarakaran et al. | ..... | 455/226.3 |

FOREIGN PATENT DOCUMENTS

WO 98/45964 A1 10/1998
WO 2004/023675 A1 3/2004

OTHER PUBLICATIONS

Partial European Search Report, EP 08022007.2; Apr. 14, 2011.

* cited by examiner

*Primary Examiner* — Peguy Jean Pierre
(74) *Attorney, Agent, or Firm* — Banner & Witcoff, Ltd

(57) ABSTRACT

Method and apparatus for dynamically optimizing the transmission level of each remote terminal in a satellite-based communication network. Each remote terminal maintains quasi-error-free communication at the highest efficiency level available under changing link conditions and network configurations, without requiring the reservation of substantial power margins, which results in a much more efficient satellite network.

38 Claims, 4 Drawing Sheets

MULTI-DIMENSIONAL ADAPTIVE TRANSMISSION TECHNIQUE

FIELD OF THE INVENTION

The invention relates to the field of satellite data transmission, and in particular to a method and apparatus for adaptively controlling transmission power in a satellite transmission system.

BACKGROUND OF THE INVENTION

In satellite communication systems, the cost of the satellite resource (space segment) is determined both according to bandwidth and to signal power. Often, a significant power margin is assumed in order to insure proper operation in non-ideal locations and under interferences such as rain or other atmospheric disturbances. These circumstances are often perceived by the end user as availability and performance problems with the overall satellite system.

There is a need for a system that can dynamically optimize transmission power levels in response to link, location, and/or equipment conditions. Thus, it is possible to reduce the power margins and consequently reduce the cost of satellite resources.

BRIEF SUMMARY OF THE INVENTION

In aspects of the present invention, a satellite-based communication network may include a central hub and one or more remote terminals (VSATs) is transmitting data to and receiving data from the hub. The transmitters of the VSAT terminals may be a linear transmitter power amplifier. Further, the system may be configured such that the VSAT terminals may be coupled in a mesh configuration as opposed to or in addition to a hub based system. Further, the remote terminals may transmit in a reverse path (e.g., towards the hub and/or another VSAT) at different symbol rates, modulations and error correction coding.

Aspects of the present invention include methods and apparatus for dynamically optimizing transmission power levels in one or more (and potentially all) remote terminals for achieving high availability and optimal use of available space segment while maintaining minimal power margins. For example, where a particular terminal has a lower transmission capability either due to permanent causes such as its location relative to the foot-print of the satellite beam or temporal causes such as localized heavy rain, the effective throughput and efficiency of that particular terminal is degraded. In conventional VSAT systems, a single power margin is chosen to accommodate every situation where the channel characteristics may be degraded. However, on average, rain fade and/or poor channels will be localized to a particular terminal or groups of terminals within one or more regions. For example, heavy rains may be localized such that it may be raining heavily in one area and not in another area. Thus, by dynamically adjusting the power margin to suit the particular characteristic of any given terminal at any point in time, it is possible to significantly reduce the power margins associated with the system and to deploy a significantly more cost effective satellite system while maintaining high availability.

In additional aspects of the invention, the systems and methods may include a normal operation mode. During normal operation mode, the transmission of each remote terminal may be configured so as not to exceed a level 1 dB less than the 1 dB compression point of its transmitter in order to avoid interference with neighboring channels. Under these circumstances, the remote terminal may transmit very efficiently (e.g., using minimal error correction overhead needed) and at the maximal throughput possible under the satellite link conditions, the network configuration and the current load.

In still further aspects of the invention, transmission levels may be optimized to achieve a predefined reception level ($E_S/N_0$) at the hub, which includes some margin (e.g. 2 dB) above the minimal reception level required for quasi-error-free communication. Considering the satellite link delay, that margin typically provides sufficient time for transmission level adjustments when link conditions deteriorate. As link conditions change (e.g. due to starting or stopping of heavy rain, snow, or ice), transmission levels may be adjusted to maintain the margin while preventing the transmitter from being driven into saturation.

In yet further embodiments, transmission power increases may be utilized with other methods. For example, if power transmission levels cannot be increased, additional mitigation may be employed. Exemplary methods and apparatus include fade mitigation through use of more robust modulations, modification of coding schemes and/or amount of coding per channel, modification of channel rates and/or the addition or switching to more robust channels as per the network configuration. In yet further embodiments, automatic network reconfiguration may also be used in order to offer more robust channels, especially when fade conditions are experienced by a larger part of the network. In this manner, link fade may be addressed by a multi-dimensional approach including power, modulation and coding in order to adapt the transmission technique to variably changing channel characteristics.

Still further aspects of the invention include its application to mesh networks. In addition to optimizing the transmission level towards the hub, transmission level optimization may be performed separately for each mesh link. As a remote terminal may be simultaneously engaged in communication towards the hub and towards one or more other remote terminals over mesh links, the remote terminal may set the power level and use coding scheme, modulation scheme, and/or modification of transmission channels of every transmission according to the optimal level for each link.

DETAILED DESCRIPTION OF THE INVENTION

Figure 1:
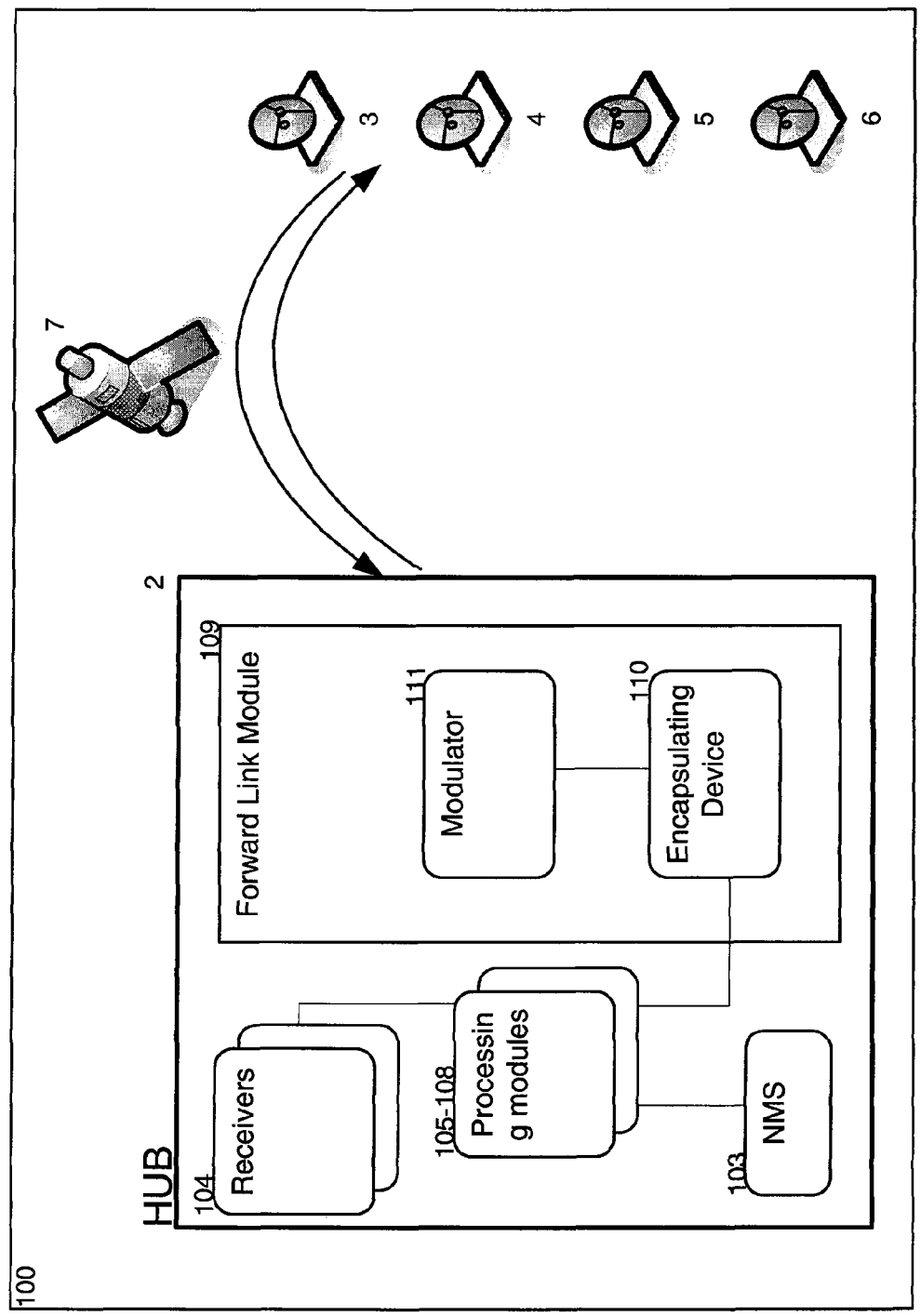
FIG. 1 shows a satellite system having a hub and a plurality of VSAT terminals in accordance with aspects of the invention.

FIG. 1 shows a satellite system 100 in accordance with aspects of the invention. Hub 2 is coupled to a plurality of VSAT terminals 3-6.

Figure 2:
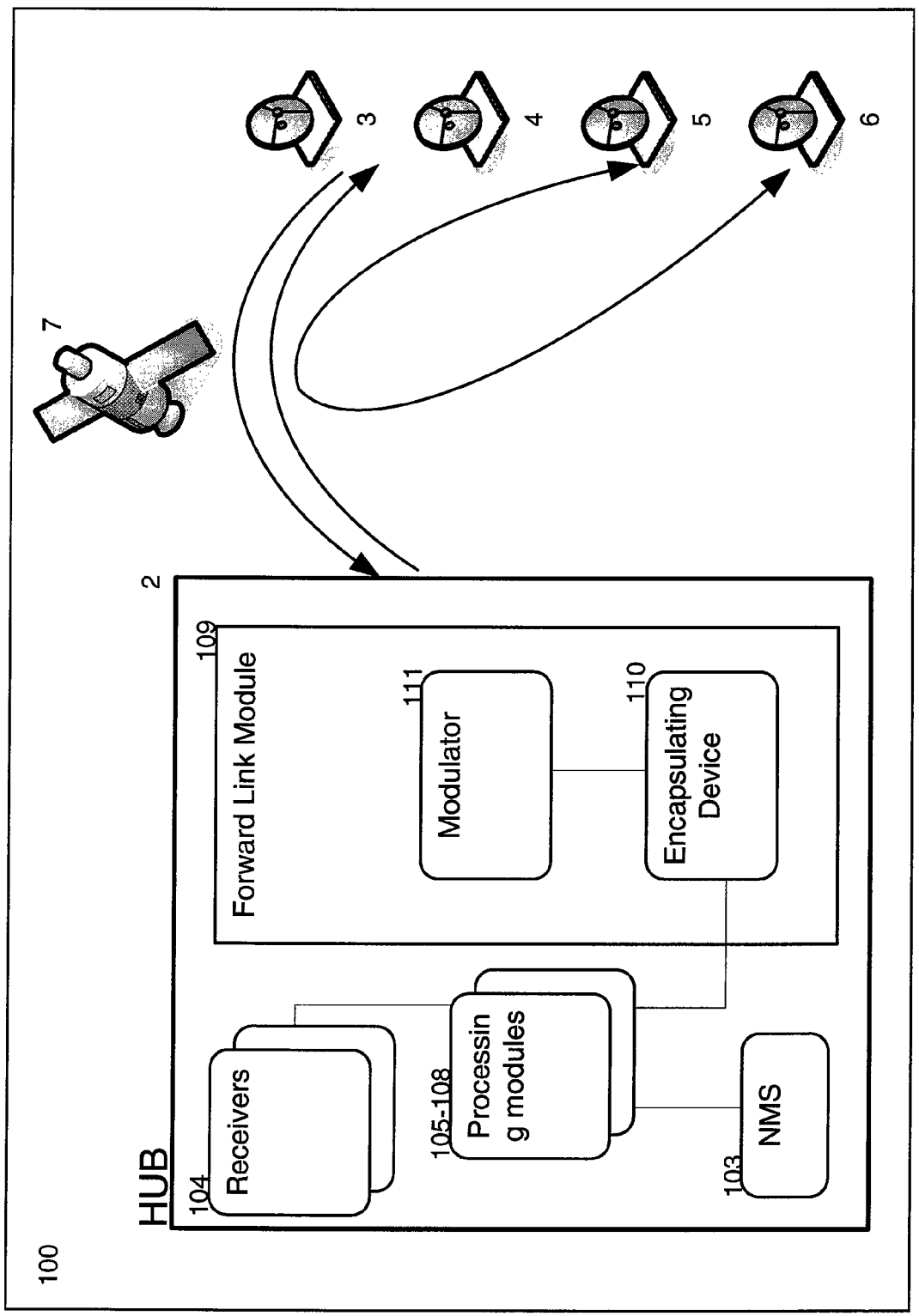
FIG. 2 shows a satellite system including a mesh network including a central hub in accordance with aspects of the invention.

FIG. 2 shows an alternate configuration of the satellite system 100. In this configuration, one or more of the VSAT terminals 3-6 may communicate with each other in a mesh configuration and may alternatively and/or additionally communicate with the hub 2.

Again referring to FIG. 1, a satellite-based communication network 100 including one or more remote terminals (VSATs) 3-6 and a central hub 2 may practice one or more methods in accordance with the present invention. For example, the hub 2 may include a network management station 103, one or more return-link receivers 104, one or more processing modules (each containing one or more processors) 105-108 and a forward-link module 109. The forward link module 109 may further include an encapsulating device 110 and a modulator 111, which may cooperate together to produce a continuous, statistically multiplexed forward-link signal, such as but not limited to a DVB-S (ETSI EN 300 421) or a DVB-S2 (ETSI EN 302 307) signal.

Figure 3:
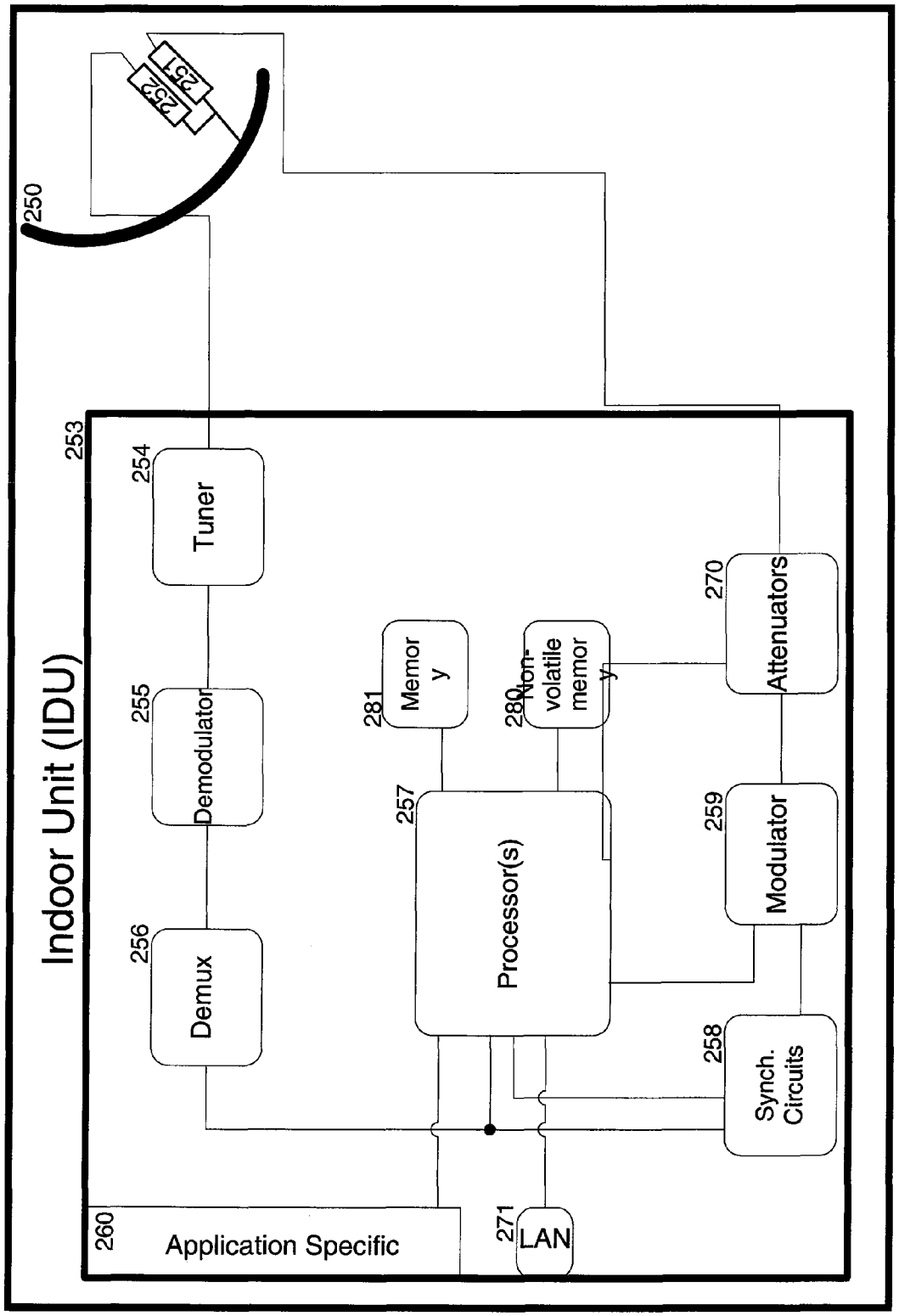
FIG. 3 shows a block diagram of a VSAT terminal having circuitry for modifying the power levels, modulation schemes, coding schemes, and transmission channels dynamically based on the particular channel characteristics.

FIG. 3 is an exemplary block diagram of one of the VSAT terminals 3-6 having circuitry for dynamically modifying the power levels, modulation schemes, coding schemes, and transmission channels based on particular transmission channel characteristics.

Again referring to FIG. 3, each remote terminal 3-6 may include a satellite dish antenna 250, a linear satellite transmitter (BUC) 251, a low-noise block amplifier 252 and an indoor unit 253. The indoor unit may further include of a tuner 254, a demodulator 255 compatible to the transmission method of the forward link, a de-multiplexing unit 256, one or more processors 257 including any non volatile memory 280 either in the processors and/or associated with the processors, any volatile memory 281 either in the processors and/or associated with the processors, synchronization circuitry 258, a return channel modulator 259, which may be configured to transmit according to the access scheme and associated methods and the protocols supported by the hub and programmable attenuators 270, which may be configured to control the transmit power. Each remote terminal may also include a mesh receiver, capable of receiving return link transmissions of other remote terminals and providing the received information to the indoor unit's processor(s).

Each remote terminal may further include additional application-specific hardware (and software) 260, which may be unrelated to this invention. Such hardware (and software) may be integrated into the indoor unit or attached to it externally using one or more LAN interfaces 271 or any other interface supported by the indoor unit or any additional hardware modules that might be integrated with or alternatively plugged into the indoor unit.

In exemplary embodiments, the forward-link signal carries all traffic from the hub 2 to all remote terminals 3-6. In these embodiments, some traffic might be addressed to specific terminals, some traffic might be addressed to groups of terminals and some traffic might be broadcasted to all terminals. Furthermore, in addition to user traffic, the forward-link signal may contain signaling information for managing the return link. This information may be formatted according to the protocol of the applicable access scheme, such as but not limited to DVB-RCS (ETSI EN 301 790).

Furthermore, the satellite-based communication network 1 may employ a scheme for accessing the return link satellite channels (access scheme) based on reservation techniques, such as, but not limited to, DVB-RCS (ETSI EN 301 790). In these embodiments, the hub may manage most, if not all, the capacity available for the return-link. A remote terminal 3-6 that has information to transmit (either to the hub or to another remote terminal in mesh topology) may utilize a control channel (the implementation of which depends on the reservation technique used) within the return link in order to transmit one or more capacity requests towards the hub. The hub may analyze the requests and signals the remote terminal over the forward link where (e.g., on which one or more return channels) and when (e.g., at what timings or timeslots) it can transmit the information.

Figure 4:
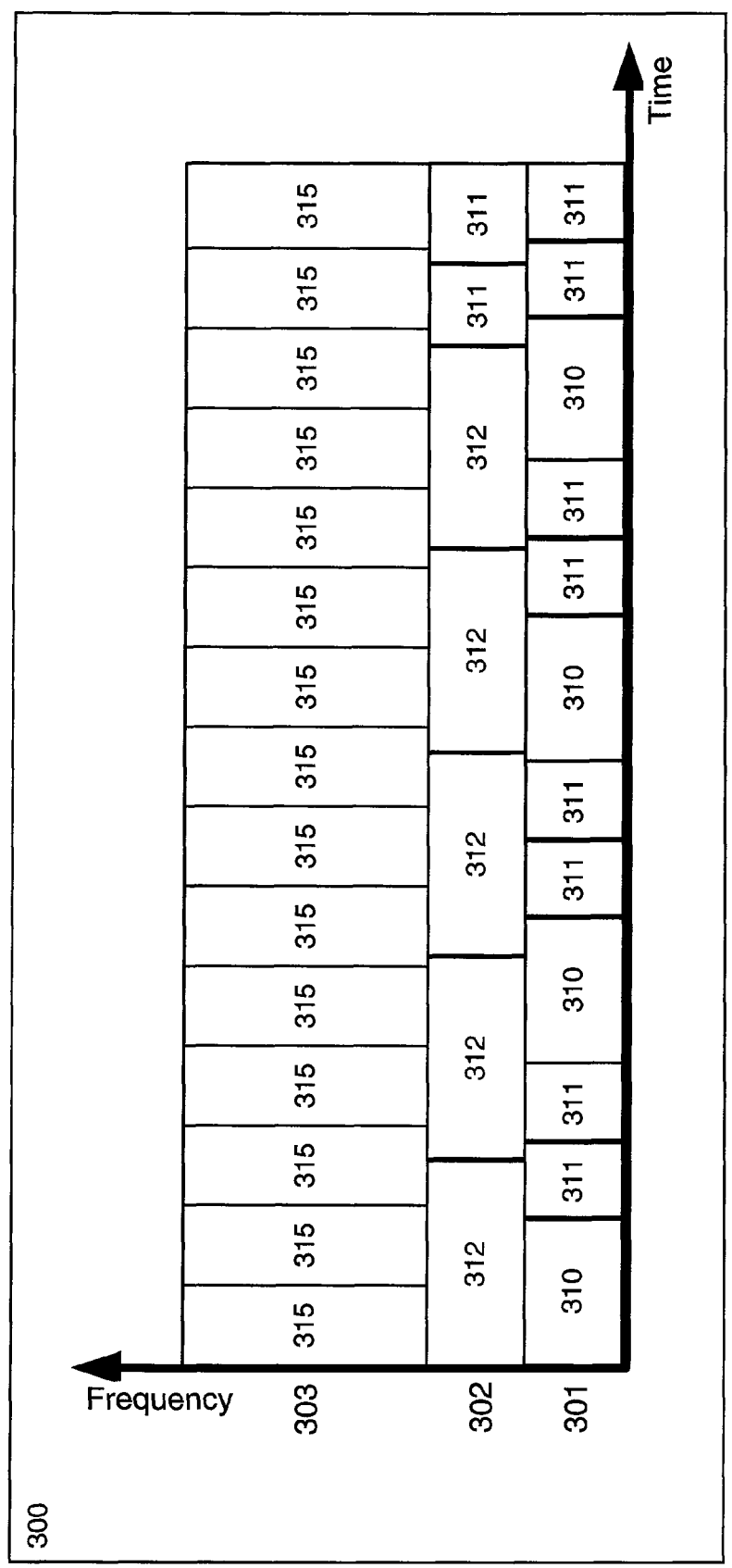
FIG. 4 shows a return-link example, containing several channel types and several timeslot types.

Furthermore, and in reference to FIG. 4, the satellite-based communication network 1 may have one or more types of return link channels 301, 302, 303. Return link channels of different types may differ in any combination of symbol rate, modulation and coding rate. In exemplary embodiments, as the bandwidth required for each channel is determined by the symbol rate property (considering M-PSK modulations), symbol rate is likely to be constant for any given channel (though this is not mandatory). Again, in reference to FIG. 4, different modulations and coding rates combinations 310-315 may be applied to any single channel under a predefined time-division scheme. In these embodiments, any such return channel may be divided in the time domain into timeslots of one or more types, which differ in modulation and/or coding rate. If multiple timeslot types may be used on the same channel, for practical reasons the sequence of different timeslot types may be repeated at a predefined interval.

In still further embodiments, each timeslot type may be characterized with a minimal reception level (e.g. $E_s/N_0$) required for quasi-error-free communication. That level may be determined by the timeslot modulation and coding rate. However, the transmission power desirable for meeting that level may be determined by the particular link conditions and by the channel symbol rate. For example, given any specific modulation and coding rate combination, it may takes twice the power to transmit twice the symbol rate in order to achieve the same reception level ($E_s/N_0$). In another example, given a specific channel and two remote terminals using the same channel (alternately or in time division over timeslots of the same type), the remote terminal which operates under heavy rain may need to transmits significantly stronger than the other terminal which operates under clear-sky conditions.

Therefore, in a satellite-based communication network, which contains return-link capacity of several types, each requiring a different transmission level from any given remote terminal, it may be desirable that the hub considers the transmission capabilities of the remote terminal when deciding which timeslots to allocate against a capacity request from that remote terminal. While the hub should strive to allocate the most efficient timeslots available, it generally also insures that the remote terminal is allocated capacity, which it can actually use. On the other hand, the VSAT should be able to tune its transmission power level and transmit efficiently at the minimal margin necessary in order to reduce space segment cost. The methods described herein achieve this important goal.

A remote terminal may be in one of two modes: Installation Mode or Normal Mode. In each of these modes, the remote terminal may take actions to determine the transmit power range, including the maximal power it can transmit without saturating its satellite transmitter.

Installation Mode is assumed whenever the remote terminal is installed or a change is made in the remote terminal's hardware, including replacement of the indoor unit, replacement of the satellite transmitter, redeployment of the cables connecting the indoor unit and the satellite transmitter, and/or movement of the antenna. Upon assuming Installation Mode, the remote terminal and/or a remote device may be configured to erase any previous knowledge, if it exists, of the transmit power range, including any measurement of the satellite transmitter's 1 dB compression point. The remote terminal may then initiates a search of the current transmit power range.

As the first step of the transmit power range search algorithm, the remote terminal may be configured to set its transmission power to a level low enough in order to avoid driving the satellite transmitter into saturation. This initial level may be predetermined based on average or typical installation parameters (therefore providing good results in most cases), and/or provided as one of the remote terminal's installation parameters.

Once the initial transmit level is determined, the remote terminal may be configured to attempt to log on into the network by sending appropriate logon messages. If the initial transmit power level is too low, the remote terminal cannot be received at the hub and no acknowledgement is received for the transmitted logon messages. Therefore, after several predefined unsuccessful consecutive attempts to log on, the remote terminal may increase the transmit power level and send additional logon messages. If the predefined number of attempts is exhausted without receiving any acknowledgement and the remote terminal cannot increase the satellite transmitter's input power any more, the remote terminal assumes the initial transmit power and continues as described above.

In alternate embodiments, the power variation between the initial transmit power level and the transmit power level necessary for being received at the hub might be considerable. Keeping the installation procedure as short as possible makes it desirable for the transmit power level to be increased in relatively large steps (e.g. 4 dB). These large steps may be further refined at a later point so as not to unnecessarily prolong the installation procedure. While the link conditions available during installation may affect the installation procedure and somewhat prolong it, this typically can be accommodated using the methods and systems described herein.

Installation Mode may be terminated and Normal Mode may be assumed once the remote terminal receives a reply to one of its logon messages. Once in Normal Mode, the remote terminal may be either in Admission Phase or in Session Phase.

In still further embodiments of the invention, when in Normal Mode, Admission Phase may be assumed whenever the remote terminal is reset. The remote terminal may set its initial transmit power level to a predefined back off (e.g. 2 dB) from the maximal transmit power level calculated since the remote terminal was last in Installation Mode and stored in the remote terminal's non-volatile memory 280. The remote terminal may then be configured to start the logon procedure and send a logon message at the initial transmit power level. If no acknowledgement is received from the hub within a predefined interval, the remote terminal may resend the logon message at the same power level. This repetition mechanism may be designed for overcoming possible loss of logon messages due to collisions if logon messages are transmitted over a common resource (e.g. under contention access). Given the number of remote terminals in the network and the predefined interval between logon retries, the number of retries required for achieving very high probability of success (i.e. at least one logon message going through without colliding with another logon message) may be calculated and used.

In these embodiments, the remote terminal may resend the logon message at the same power level a predefined number of times. If none of the attempts is acknowledged, the remote terminal may increase the transmit power level by a predefined step before attempting to send additional logon messages. As the initial transmit power level is relatively high (a predefined back off from the highest 1 dB compression point measurement), the increase step may be relatively small (e.g. 1 dB or smaller) in order to increase the probability of avoiding saturation of the satellite transmitter. The remote terminal may continue to send logon messages and increase the transmit power level until it receives a logon acknowledgement from the hub. If the remote terminal reaches the maximal transmit power level as per the indoor unit capabilities and no acknowledgement is received for any of the logon attempts, the entire procedure, as described above, may be repeated starting at the initial transmit power level.

In still further embodiments, once a logon acknowledgement is received, the remote terminal may be configured to assume the Session Phase. Whenever the terminal is configured to enter Normal Mode for the first time after Installation Mode, the remote terminal may already be logged on and its initial transmit power level may already be determined (as described above) and therefore it may assume the Session Phase immediately upon assuming Normal Mode.

In embodiments of the satellite-based communication network 1, while in Session Phase, the remote terminal may transmit link maintenance packets or messages at predefined intervals over collision-free resources (timeslots allocated by the hub to the remote terminal only for this purpose). The hub may require such packets or messages to be constantly received at short intervals in order to quickly detect loss of communication with the remote terminal. These maintenance packets or messages may be used for monitoring the level (e.g. $E_S/N_0$) at which the remote terminal is received at the hub, and consequently the results of such monitoring may be used for properly adjusting the remote terminal's transmit power level.

For each maintenance packet received, the hub may transmit a reply over the forward link, containing the reception level (e.g. $E_S/N_0$) measured for the maintenance packet. The remote terminal may receive the reply and adjust the transmit power level in order for any additional packets that may be transmitted to be received at the hub at a nominal reception level.

The nominal reception level may be set as a predefined constant value (margin) above the minimal reception level required for quasi-error-free communication. Considering the interval between consecutive maintenance packets and the satellite delay, that margin has to provide sufficient time for the remote terminal to adjust the transmit power level whenever link conditions deteriorate. As the maximal deterioration rate is often considered as 1 dB per second, a margin of 2 dB and an interval of 1 second between consecutive maintenance packets may provide the remote terminal sufficient time for detecting any change in link conditions and compensating for it by appropriately adjusting its transmit power level. If a network is designed for a maximal deterioration rate different than 1 dB per second, other values for the margin and maintenance packets interval may be used in order to efficiently achieve the above goals (e.g., with minimum space segment allocated for the maintenance packets). Whenever working in fade free link (C band), the fade rate margin might be smaller than 1 dB.

In addition to maintenance packets, the remote terminal may also be expected to transmit user data packets. As the return link of the satellite-based communication network may include different timeslot types, for its data transmissions the remote terminal may be allocated timeslots of several types, each with different minimal reception level (e.g. $E_S/N_0$) characteristic (due to a different combination of symbol rate, modulation and coding rate). Therefore, for each such data transmission, the remote terminal may adjust the transmit power level according to the timeslot type allocated for the transmission. Upon deterioration of satellite link conditions, the remote terminal may compensate for the deterioration by increasing the transmit power level. Such increase may be limited both by the maximal transmit power level of the indoor unit towards the satellite transmitter and by the satellite transmitter's maximal output power (at the 1 dB compression point).

In still further embodiments, when in Session Phase (e.g., while the remote terminal may already be logged on to the network and have determined its initial transmit power level), the remote terminal may measure the saturation point of its satellite transmitter (1 dB compression point) and thereafter set the maximal transmit power to a predefined back off from the measured saturation point. This measurement procedure may be repeated at relatively long intervals (e.g. every one hour or longer). However, as the satellite transmitter experiences changes in its gain and in its 1 dB compression point over time (for example, due to changes in its ambient temperature), the back off may be helpful in order to avoid the saturation point due to such changes occurring during the interval between two consecutive saturation measurements. Though the exact back off may depend on the specific satellite transmitter characteristics and on the interval between consecutive measurements, a 1 dB back off from the 1 dB compression point (relative to the satellite transmitter's output power) is considered sufficient for most cases. In some embodiments, e.g. where the gain of the satellite transmitter is very stable over temperature, it may be possible to take no back off from the saturation point (or in other words set the back off to 0 dB). In such embodiments, the maximal transmit power for the remote terminal might be set as equal to the measured saturation point.

Furthermore, while in Session Phase, the described saturation point measurement procedure may be performed once every predefined interval (e.g. once an hour). A remote terminal may be configured to divide the saturation search into two phases. During a first phase, a remote terminal may be configured to transmit maintenance packets in decreasing power levels until finding a minimal transmission power level. In some embodiments, the remote terminal may be configured to decrease the transmission power level until one or more of the transmitted maintenance packets are not acknowledged (i.e. due to not being received at the hub). The remote terminal may then set that transmission level or any transmission level higher than that transmission level by a predetermined offset as the minimal transmission level. Furthermore, during a second phase, a remote terminal may be configured to transmit maintenance packets in increasing power levels until the saturation point (1 dB compression point) is detected. In some embodiments, the remote terminal may be configured to use only a single phase saturation search, where that only phase is similar to the second phase of the dual phase search algorithm described above.

In either or both of the above-mentioned phases, a remote terminal may transmit a predefined number of maintenance packets at the same transmit power level. The remote terminal may then receive from the hub reception level (e.g. $E_S/N_0$) measurements for the transmitted maintenance packets. As measurement errors are normally distributed, in order to achieve an accurate measurement the remote terminal may be configured to use the received measurements to calculate an average reception level (e.g. $E_S/N_0$) for the transmitted maintenance packets. The remote terminal may then change the transmit power level of maintenance packets by a predefined step and repeat the above procedure, i.e. the sending of a predefined number of maintenance packets at the new transmit power level and calculating the average reception level based on the reception level measurements received from the hub. As the remote terminal is expected to transmit close to the saturation point, the increase step should be quite small (e.g. 0.5 dB) in order to minimize undesired interferences and avoiding possible damage to the satellite transmitter.

In still additional embodiments, for every transmit power level, the remote terminal may compare the current gain of the satellite transmitter with all previous gain measurements and search for 1 dB gain drop. Normally, the satellite transmitter's gain may be defined as the ratio between its output power level and its input power level. However, since directly measuring these parameters during normal operation may often be impractical, an indirect method may be used. The calculated average reception level may replace the satellite transmitter's output power level as these may be linearly linked (assuming that link conditions are constant during the measurement procedure). In addition, the satellite transmitter's input power level may be calculated using the values of any configurable attenuators on the transmit path, as these may be reversed linearly linked. Therefore, the satellite transmitter's gain may be represented by the difference between the average reception level and the calculated input power level. While operating in its linear range, the calculated gain may be expected to remain constant through changes in the input power level (up to very small variations which in most part result from the measurement accuracy level). As the input power level is increased, the gain is expected to decrease. The remote terminal may perform the above described procedure until a 1 dB drop in the calculated gain may be determined. The input power level (or its representation using values of any configurable attenuators on the transmit path) for which such drop may be detected is considered the 1 dB compression point.

In these embodiments, the remote terminal may continue performing the above-described procedure and increase the satellite transmitter's input power level until the 1 dB compression point is detected. The remote terminal may then be configured to set the maximal transmit level to the highest input power level for which the measured gain is still 1 dB higher than the gain measured at the 1 dB compression point. In some embodiments, the remote terminal may be configured to set the maximal transmit power to the input level corresponding to the measured 1 dB compression point. In addition, if the maximal transmit power level value stored in non-volatile memory is lower than the newly calculated value or no value is available there at all (first time after Installation Mode), the remote terminal may store the newly calculated maximal transmit level in non-volatile memory for use during the Admission Phase (as previously described).

In some embodiments, a satellite communication system may include imparities, which may affect the ability of the system to accurately measure the 1 dB compression point of a remote terminal. These imparities may result in variations in transmission power of the remote terminal's satellite transmitter and in variances in reception level (e.g. $E_S/N_0$) measurements. Consequently, the 1 dB compression point is calculated with greater variance, i.e. the calculated values are within a wider range around the exact value (e.g. within a range of ±2 dB instead of ±0.5 dB).

Assuming that measurement variances and transmission level variances are normally distributed and that the actual value of the 1 dB compression point of any given satellite transmitter changes so slowly, 1 dB compression point calculation may be improved and made more accurate by averaging a last found value with a predefined number of previously calculated values.

In order to minimize interferences, the remote terminal may limit the saturation point measurement procedure to the maximal reception level (e.g. $E_S/N_0$) needed according to the most demanding timeslot type available over the return link plus a predefined margin for fade mitigation. This method allows installation of more powerful satellite transmitters than initially required and therefore allows for supporting future increase in communication rate and efficiency without requiring any re-installation procedure.

While performing the saturation point measurement procedure, data packets may also be transmitted as necessary. While the remote terminal may increase the transmit power level for the maintenance packets, data packets may be transmitted at power levels corresponding to the timeslot type allocated for each transmission in order for each transmission to be received at the hub at the nominal reception power.

Furthermore, while performing the saturation point measurement procedure, the remote terminal may monitor the reception level (e.g. $E_S/N_0$) of the forward link (e.g. by reading appropriate telemetry from its demodulator) in order to detect degradations in the satellite link. If such degradation is detected, the remote terminal may abort the saturation point measurement procedure.

In another possible variant of the above-described method, the transition from Installation Mode to Normal Mode may occur after one successful execution of the saturation point measurement procedure. While remaining in Installation Mode, no user data packets may be transmitted.

After the remote terminal succeeds to logon into the network (i.e. a logon reply is received), the remote terminal remains in Installation Mode and begins the execution of the saturation point measurement procedure (described above) while using the same transmit power level of the successful logon message as the initial transmit power level. If, after the first increase of transmit power, the remote terminal determines that the satellite transmitter may be saturated, the procedure can be configured to fail and the remote terminal may remain in Installation Mode until another execution of the saturation point measurement procedure is successful. If after the first increase of transmit power any gain drop measured may be lower than a predefined threshold (which may be significantly lower than 1 dB), the remote terminal may continue executing the procedure until maximal transmit power is determined. Once maximal transmit power is determined, the remote terminal may be configured to transition to Normal Mode and follow the Normal Mode procedures as described above.

Another aspect of this invention relates to the hub's part in the multi-dimensional adaptive transmission technique.

As stated above, the return link of the satellite-based communication network may include several different timeslot types over several channels of one or more symbol rates. Channels of higher rate and timeslots of more efficient modulation and coding rate combinations (i.e. higher bits/symbol or bits/Hz ratio) require higher reception levels for quasi-error-free communication, while lower rate channels and more robust modulation and coding rate combinations require lower reception levels for achieving the same performance (e.g. BER or PER).

In addition, in many cases most remote terminals in the satellite-based communication network operate under clear-sky or near-clear-sky conditions (i.e. conditions which may be only slightly degraded compared to clear-sky conditions) most of the time. Most remote terminals may occasionally experience significant degradation (e.g. as a result of an exceptionally heavy rain). The total duration of such occasions may add up to no more than several days per year (i.e. probably not more than 2%-3% of the time). In additions, the network may include some remote terminals, which operate under degraded link conditions over significant periods of time (e.g. due to being installed in a particularly rainy location or closer to the edge of the satellite beam foot-print).

Therefore, in order to make the most efficient use of space segment and satellite power, most of the return link should be comprised of more efficient and less robust timeslots, which most remote terminals may utilize most of the time. In addition, the return link should be further comprised of some less efficient and more robust timeslots, in order to allow the remote terminals to maintain connectivity with the hub upon experiencing degradation in link conditions and in order to support those remote terminals, which operate on a degraded link most of the time.

As stated above, embodiments of the satellite-based communication network may employ a scheme for accessing the return link satellite channels (access scheme) based on reservation techniques, such as, but not limited to, DVB-RCS (ETSI EN 301 790). In these techniques, the hub manages most, if not all, the capacity available for the return-link and assigns return-link timeslots against remote terminals' requests. Therefore, in order for a remote terminal to successfully utilize any timeslots assigned to it, upon assigning the timeslots the hub must consider the link conditions of the remote terminal and the remote terminal's transmit power range.

In still further embodiments, each remote terminal may include in each of its link maintenance packets an information item containing the delta between the transmit power at which the maintenance packet may be transmitted and the maximal transmit power as last measured and calculated. For each received maintenance packet, the hub may add the delta included in the packet to the measured reception level (e.g. $E_S/N_0$) of the packet and derive the maximal reception level the remote terminal may achieve at that time. For each remote terminal, the hub stores the calculated maximal reception level and may update it whenever an additional maintenance packet is received.

In exemplary embodiments, when the hub receives a capacity request from a remote terminal, the hub may use the maximal reception level value stored for the remote terminal in order to determine the most efficient timeslot type that may be utilized by the remote terminal. The hub may then assign the remote terminal timeslots of any type, the nominal reception level (which may be the minimal reception level required for quasi-error-free communication plus a predefined margin, as described above) of which is not higher than the calculated maximal reception level.

In another embodiment of this invention, the hub may measure and/or gather statistics on the distribution of allocations between the different timeslot types comprising the return-link. The hub may also calculate the percentage of remote terminals, which may transmit using any of same timeslot types. Using this information, the hub may reconfigure the return link in order to adjust the blend of timeslot types to the changing needs of the network. For example, if the number of remote terminals requiring robust timeslots is low, the hub may decide to reconfigure some of the channels to include less robust and more efficient timeslots. In another example, if the number of remote terminals experiencing degradation in satellite link is exceptionally high, the hub may split a high rate channel into two lower rate channels and/or reconfigure some channels to include more robust timeslots. By doing so, the hub may add yet another dimension of adaptivity.

Another embodiment of this invention may include transmitting over a wide frequency range, including over several satellite transponders, which are not necessarily adjacent in the frequency domain. While transmitting over a relatively narrow band (e.g. up to 36 MHz, which may be the frequency width of a typical transponder), the remote terminal may assume that satellite transmitter's gain may be constant over the entire band. However, this assumption cannot be made when transmitting over a wider range, as the gain of the satellite transmitter significantly varies (more than 1 dB) across the full frequency range (usually 500 MHz).

In yet another embodiment of this invention, multi-dimensional adaptive transmission may be applied to mesh connectivity. In addition to optimizing the transmission level towards the hub, transmission level optimization may be performed separately for each mesh link. As a remote terminal may be simultaneously engaged in communication towards the hub and towards one or more other remote terminals over mesh links, the remote terminal may set the power level of every transmission according to the optimal level for each link. Furthermore, the hub may be advised of measured mesh reception levels for each link. The hub may then determine the most efficient timeslot, modulation, channel, and coding type for each link and allocate the satellite resources accordingly therefore achieving all the efficiency benefits described earlier in this document for mesh links as well.

The invention claimed is:

1. A method for adjusting the transmission power of a remote terminal in a satellite system, the method comprising:
operating a remote terminal in an installation mode when the remote terminal is installed or when its configuration is modified, and operating the remote terminal in a normal mode at other times, wherein operating the remote terminal in the installation mode comprises:
erasing any previously stored transmit power range and any previously stored maximal transmit power level;
determining an initial transmit power level using a predefined value;
sending a predefined number of logon messages at the determined initial transmit power level;
increasing the transmit power for logon messages upon failing to receive acknowledgement for any of the transmitted logon messages; and
upon receiving an acknowledgement one or more of the transmitted logon messages, configuring the remote terminal to operate in the normal mode.

2. The method of claim 1, further comprising operating the remote terminal in the installation mode upon a change in the remote terminal's hardware, including upon replacement of an indoor unit, upon replacement of a satellite transmitter, or upon redeployment of cables connecting the indoor unit and the satellite transmitter.

3. The method of claim 1, further including setting the transmit power back to the initial transmit power level if no acknowledgement is received and the transmit power cannot be increased any further.

4. The method of claim 1, including determining the initial transmit power level using an installation parameter.

5. The method of claim 1, including configuring logon messages to follow the format of CSC bursts as defined by DVB-RCS (ETSI EN 301 790).

6. The method of claim 1 where the satellite network is over Ku-band.

7. The method of claim 1 where the satellite network is over C-band.

8. The method of claim 1 where the satellite network is over Ka-band.

9. A method comprising:
transmitting from a remote terminal in a satellite-based communication network a predefined number of maintenance packets at the same transmit power level;
receiving reply packets over a forward link containing reception level measurements of the transmitted maintenance packets;
calculating the average reception level for the transmitted maintenance packets;
calculating a gain equivalent as the difference between the average reception level and a satellite transmitter's input power level;
repeatedly increasing the transmit power level of the satellite transmitter; and repeating the above steps for each increased transmit power level, until about a 1 dB drop in gain is detected and an about 1 dB compression point is found;
calculating a maximal transmit power level as the satellite transmitter's highest input power level for which the calculated gain is about 1 dB higher than the gain measured at the about 1 dB compression point; and
storing the calculated maximal transmit power level in non-volatile memory, if the calculated maximal transmit power level is greater than an already stored power level value, or if no previous power level value is available.

10. The method of claim 9, wherein the maximal transmit power level corresponds with the found about 1 dB compression point.

11. The method of claim 9 further including a step of calculating the about 1 dB compression point as the average of a found about 1 dB compression point value with a predefined number of previously found about 1 dB compression point values.

12. The method of claim 9, wherein the increasing in transmit power level is stopped once the calculated average reception level reaches the maximal reception level needed according to a most demanding timeslot type available over the return link plus a predefined margin.

13. The method of claim 12, including repeating the sequence at predefined intervals.

14. The method of claim 12, including basing reported reception levels and the calculated average reception level on Es/N0 measurements by a hub.

15. The method of claim 12, including basing reported reception levels and the calculated average reception levels on C/N measurements by a hub.

16. The method of claim 12, where the satellite transmitter's input power level is calculated based on the current settings of any configurable attenuators along the transmit path.

17. The method of claim 12, where maintenance packets are configured to follow the format of SYNC bursts as defined by DVB-RCS (ETSI EN 301 790) with the extension of the information item located after all mandatory information items defined by DVB-RCS.

18. The method of claim 12, where maintenance packets are configured to follow the format of TRF bursts as defined by DVB-RCS (ETSI EN 301 790), including any proprietary modifications to the format defined by DVB-RCS.

19. The method of claim 12, further comprising operating the remote terminal in an installation mode when the remote terminal is installed or when its configuration is modified, and operating the remote terminal in a normal mode at other times, wherein transitioning from installation mode to normal mode is performed after at least one successful determining of the maximal transmit power level.

20. The method of claim 19 further including:
comparing the gain equivalent results of first and second transmit-power levels;
remaining in installation mode, if a drop in gain is larger than a predefined threshold; and assuming normal mode after the calculated maximal transmit power level is stored in non-volatile memory.

21. A method comprising:
measuring or gathering statistics on the distribution of allocations between different timeslot types in a return link of a satellite-based communication network;
calculating a percentage of remote terminals in the satellite-based communication network which may transmit using any of the different timeslot types; and
reconfiguring the distribution of allocations between the timeslot types, by adjusting the distribution of allocations based on the needs of the network as reflected by said measurements and calculations.

22. A method for adjusting the transmission power of a remote terminal in a satellite system, the method comprising:
operating a remote terminal in an installation mode when the remote terminal is installed or when its configuration is modified, and operating the remote terminal in a normal mode at other times, the normal mode comprising an admission phase and a session phase, wherein operating the remote terminal in the admission phase of the normal mode comprises:
determining an initial transmit power level using a predefined back off from a highest maximal transmission level stored in the remote terminal's non-volatile memory;
sending a predefined number of logon messages at the determined initial transmit power;
increasing the transmit power for logon messages upon failing to receive acknowledgement for any of the transmitted logon messages; and
upon receiving an acknowledgement for one or more of the transmitted logon messages, configuring the remote terminal to operate in the session phase.

23. The method of claim 22, further including configuring the transmit power back to the initial transmit power level if no acknowledgement is received at a maximal transmit power, wherein the maximal transmit power is determined by a maximal output power of an indoor unit of the remote terminal.

24. The method of claim 22, including configuring logon messages to follow the format of CSC bursts as defined by DVB-RCS (ETSI EN 301 790).

25. The method of claim 22, wherein operating the remote terminal in the session phase of the normal mode comprises:
transmitting maintenance packets to the hub at either automatically calculated or predefined intervals and configuring each maintenance packet to include an information item containing the delta between the transmit power at which the maintenance packet is transmitted and the maximal transmit power as last measured or calculated by the remote terminal.

26. The method of claim 25, including configuring the maintenance packets to follow the format of SYNC bursts as defined by DVB-RCS (ETSI EN 301 790) with the extension of the information item located after all mandatory information items defined by DVB-RCS.

27. The method of claim 25, including configuring the maintenance packets to follow the format of TRF bursts as defined by DVB-RCS (ETSI EN 301 790), including any proprietary modifications to the format defined by DVB-RCS.

28. The method of claim 25, including measuring at the hub the reception level of each received maintenance packet and sending a reply packet over the forward link containing the measured reception level of the maintenance packet.

29. The method of claim 28, including configuring the reception level to be Es/N0 of the received packet's signal.

30. The method of claim 28, including configuring the reception level to be C/N of the received packet's signal.

31. The method of claim 28, including configuring the reply packet to be transmitted as part of a Correction Message Table (CMT) as defined by DVB-RCS (ETSI EN 301 790).

32. The method of claim 28, including configuring the reply packet to be transmitted as part of a correction message descriptor included in a unicast Terminal Information Message (TIM) as defined by DVB-RCS (ETSI EN 301 790).

33. The method of claim 28, including configuring the remote terminal to adjust its transmit power level on a transmission by transmission basis according to the timeslot type assigned for each transmission and according to the reception level information included in the reply packets.

34. The method of claim 33, including determining a decline in reception level as reported in reply packets and configuring the remote terminal to increase its transmit power level up to the maximal transmit power level as limited either by the indoor unit capabilities or the satellite transmitter's maximal output power at the maximal transmit power point.

35. The method of claim 28, further comprising:
calculating at the hub a maximal reception level as the sum of the measured reception level of a received maintenance packet and the delta value contained in the maintenance packet;
storing a maximal reception level for each remote terminal; and
updating the maximal reception level for a remote terminal upon reception of every maintenance packet from the remote terminal.

36. The method of claim 35, further comprising, upon allocating capacity to a remote terminal:
retrieving a last maximal reception level value for the remote terminal;
determining a most efficient timeslot type for which the nominal reception level is still below the maximal reception level for the remote terminal; and
assigning the remote terminal timeslots of the most efficient timeslot type.

37. The method of claim 36, further comprising:
determining a lack of sufficient suitable timeslots of the most efficient timeslot type, and assigning timeslots of one or more less efficient types in which nominal reception level is still below the maximal reception level of the remote terminal.

38. The method of claim 37, including assigning timeslots of less efficient types from considerations other than lack of suitable timeslots of the most efficient type.

* * * * *